(12) United States Patent
Apolinski

(10) Patent No.: US 6,360,798 B1
(45) Date of Patent: Mar. 26, 2002

(54) ROUTER TABLES

(75) Inventor: Edmund Apolinski, Chicago, IL (US)

(73) Assignee: Wolfcraft GmbH, Kampenich (DE)

( * ) Notice: Subject to any disclaimer, the term of this patent is extended or adjusted under 35 U.S.C. 154(b) by 0 days.

(21) Appl. No.: 09/636,702

(22) Filed: Aug. 11, 2000

(51) Int. Cl.$^7$ ................................................. B25H 1/00
(52) U.S. Cl. .................. 144/286.5; 83/468.1; 83/471.3; 144/135.2; 144/251.2; 144/252.1; 144/253.2; 144/253.5; 144/307; 144/308; 144/286.1; 269/303; 409/134
(58) Field of Search ............................ 83/468.2, 471.3, 83/421, 438, 440.2, 477; 144/1.1, 134.1, 135.5, 251.1, 251.2, 253.1, 253.2, 253.4, 253.5, 286.1, 286.5, 306–308; 200/43.02, 43.04; 269/289 R, 291, 303, 315, 318; 409/134, 137

(56) References Cited

U.S. PATENT DOCUMENTS

| 404,233 A | 5/1889 | Teeguarden |
| 727,337 A | 5/1903 | Forster |
| 1,183,566 A | * 5/1916 | Jessrang .................. 144/251.2 |
| 1,664,969 A | 4/1928 | Conover |
| D105,621 S | 8/1937 | Tautz |
| 3,101,104 A | 8/1963 | Sullivan |
| 3,905,273 A | 9/1975 | Shook |
| 4,088,164 A | 5/1978 | McCord, Jr. |
| D248,304 S | 6/1978 | McCord, Jr. et al. |
| 4,186,784 A | 2/1980 | Stone |
| D273,195 S | 3/1984 | Ferdinand et al. |
| 4,603,612 A | * 8/1986 | Atkins ....................... 83/473 X |
| 4,615,247 A | 10/1986 | Berkeley |
| 4,719,951 A | 1/1988 | Woltanski |
| 4,738,571 A | 4/1988 | Olson et al. |
| 4,750,536 A | 6/1988 | Grisley |
| 4,884,604 A | 12/1989 | Rice et al. |
| 5,000,237 A | 3/1991 | Berkeley et al. |
| 5,024,257 A | 6/1991 | Lloyd |
| 5,025,841 A | 6/1991 | Totten |
| 5,042,542 A | 8/1991 | Purviance |
| 5,117,880 A | * 6/1992 | Kapton et al. .......... 409/134 X |
| 5,139,065 A | 8/1992 | Stark |
| D334,388 S | 3/1993 | Wixey et al. |
| D343,846 S | 2/1994 | Balolia et al. |
| 5,611,378 A | 3/1997 | Brazell |
| 5,755,148 A | 5/1998 | Stumpf et al. |
| 5,755,319 A | 5/1998 | Szymanski et al. |
| 5,779,407 A | * 7/1998 | Tucker et al. ........ 144/253.1 X |
| 5,855,234 A | 1/1999 | Everts et al. |
| 5,865,079 A | 2/1999 | Itzov |
| 5,943,931 A | 8/1999 | Stumpf et al. |
| 6,237,658 B1 | * 5/2000 | Hylton ..................... 144/253.2 |
| 6,170,372 B1 | * 1/2001 | Weaver ............... 144/253.1 X |
| 6,234,056 B1 | * 5/2001 | Oslick ................. 144/253.1 X |

* cited by examiner

*Primary Examiner*—W. Donald Bray
(74) *Attorney, Agent, or Firm*—Schiff Hardin & Waite

(57) ABSTRACT

Router tables, generally used for woodworking, have fences used to guide workpieces during cutting. The router table has a table top which has a top work surface and a router bit hole through the table top. A plurality of support legs are provided below the table top. A safety shield is positioned above the router bit hole. The workpiece fence has left and right fences which operate independently of each other. The left and right fences slide on the top work surface in a front to rear direction and a side to side direction. A feather flap extends from the workpiece fence and holds the workpiece down against the table top during cutting.

5 Claims, 4 Drawing Sheets

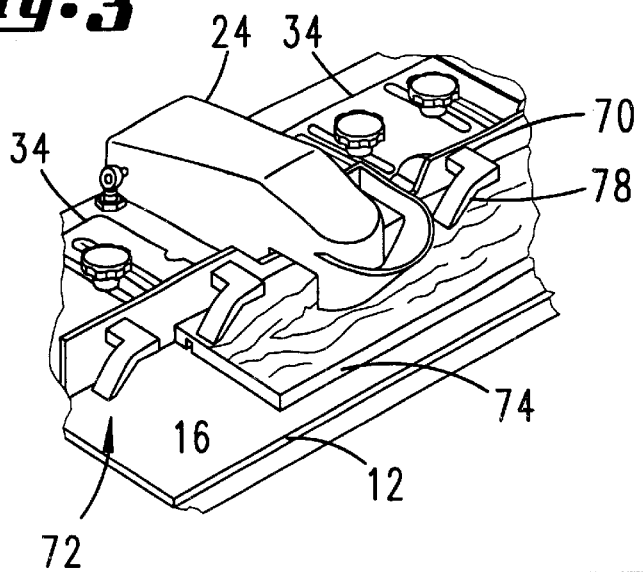
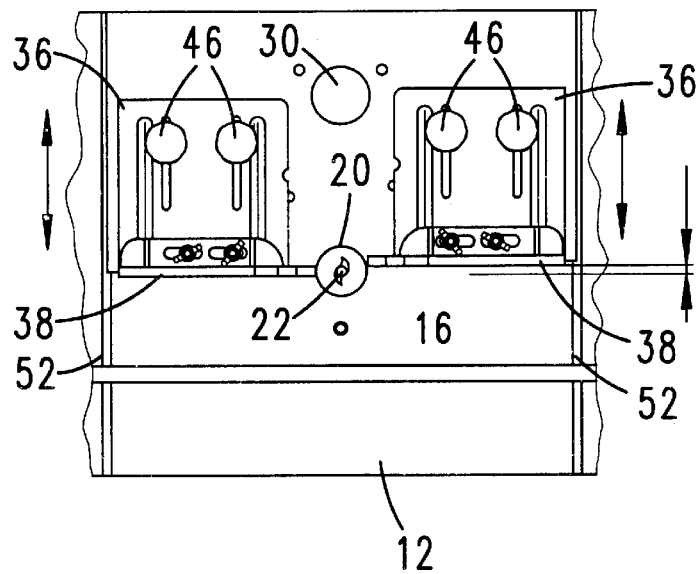
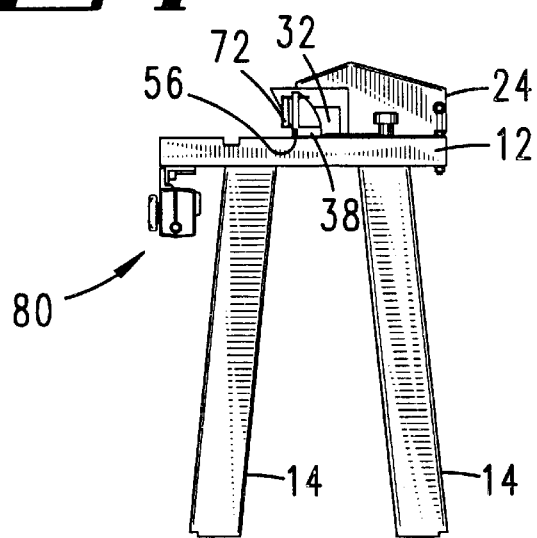

ROUTER TABLES

FIELD OF THE INVENTION

The present invention generally pertains to power tools for woodworking. More specifically, the present invention pertains to router tables used with routers. The present invention also pertains to fences used to guide workpieces during cutting.

BACKGROUND OF THE INVENTION

Woodworking power tools, such as a router mounted on a router table, are commonly used to cut wood workpieces. Typically, a power router and router table assembly has the router mounted underneath table with the router bit facing vertically upward. The router bit extends upward through a hole in the router table and protrudes above the table. Existing router tables have had adjustable fences on top of the table. The wood workpiece can be slid on the table and along the fence to engage and be cut by the router bit.

Examples of U.S. patents pertaining to wood working power tools, including router and router tables, include U.S. Pat. No. 404,233 titled Saw Table Gage; U.S. Pat. No. 727,337 titled Guide for Woodworking Machines; U.S. Pat. No. 1,664,969 titled Guide for Molder Tables; U.S. Pat. No. 3,101,104 titled Safety Device for Saws; U.S. Pat. No. 3,905,273 titled Machine Tool Assembly; U.S. Pat. No. 4,088,164 titled Portable Router Attachment; U.S. Pat. No. 4,186,784 titled Tool Table Construction; U. S. Pat. No. 4,615,247 titled Anti-Kickback System; U.S. Pat. No. 4,719,951 titled Combination Drill Press, Router and Shaper Table, and Methods of Constructing and Utilizing Same; U.S. Pat. No. 4,738,571 titled Routing Apparatus With Dust Extraction System; U.S. Pat. No. 4,750,536 titled Router Vacuum Attachment; U.S. Pat. No. 4,884,604 titled Guide Fence and Mitre Guide Assembly for Router Mounting Table; U.S. Pat. No. 5,00,237 titled Jointer Cutter Guard with Featherboard; U.S. Pat. No. 5,024,257 titled Woodworking Machine; U.S. Pat. No. 5,025,841 titled Multipurpose Support Table for a Router; U.S. Pat. No. 5,042,542 titled Router Table Gauge; U.S. Pat. No. 5,139,065 titled Auxiliary Drop-In Table Top Power Tool Base; U.S. Pat. No. 5,611,378 titled Tilting Router Table; U.S. Pat. No. 5,755,148 titled Adjustable Fence for a Compound Miter Saw; U.S. Pat. No. 5,755,319 titled Safety Power Switch; U.S. Pat. No. 5,855,234 titled Router Table Assembly with Microset Throat Plate; U.S. Pat. No. 5,865,079 titled Adjustable Workpiece Support Apparatus for a Compound Miter Saw; U.S. Pat. No. 5,943,931 titled Adjustable Fence for a Compound Miter Saw; U.S. Pat. No. Des 105,621 titled Shaper Table; U.S. Pat. No. Des 248,304 titled Table for Portable Cutting Tools; U.S. Pat. No. Des 273,195 titled Power Tool Table; U.S. Pat. No. Des 334,388 titled Combination Bench Router and Shaper; and U.S. Pat. No. Des 343,846 titled Router Table.

Existing router tables and other wood working power tools have included fences for guiding the wood workpieces during cutting. However, existing fences can be improved. Also, existing woodworking power tools, such as router tables, can be improved. For example, improvements can be made to hold down wood workpieces during cutting.

SUMMARY OF THE INVENTION

The present invention provides new router tables for use with routers to cut workpieces. The present invention also provides new fences for guiding workpieces during routing. The new fences have feather board flaps which provide support for the workpieces by holding the workpieces securely against a table top. The feather board flaps can reduce chatter and kickback.

One new router table according to the present invention includes a table top having a top work surface and a router bit hole through the table top. A plurality of support legs are provided below the table top. A safety shield is positioned above the router bit hole. A workpiece fence is slidably positioned on the top work surface, and a feather flap extends from the workpiece fence.

Preferably, the feather flap is removable from the workpiece fence and can be inserted in various holes through the workpiece fence. The feather flap may have a first portion extending from the workpiece fence and a second portion extending from the first portion downward toward the top work surface of the table top.

The router table also has a switch box which has an electrical outlet, and ON/OFF switch with a safety key, and a resettable circuit breaker. The table top of the router table has an exhaust hole for removing debris during cutting of the workpiece.

The workpiece fence has a left workpiece fence which is independent of a right workpiece fence. The left and right workpiece fences have a fence base which is slidable in a front to rear direction on the table top. A fence front is mounted to the fence base and slides in a side to side direction.

One fence system for guiding a workpiece according to the present invention includes a fence base having a left front edge portion spaced apart from a right front edge portion by a gap. A left fence front is slidably mounted to the left front edge portion of the fence base, and a right fence front is slidably mounted to the right front edge portion of the fence base. A feather flap extends from at least one of the left and right fence fronts.

Advantages of the present invention may become apparent upon reading this disclosure including the appended claims and with reference to the accompanying drawings. The advantages may be desired, but may not necessarily be required to practice the present invention.

BRIEF DESCRIPTION OF THE DRAWINGS

FIG. 3 is an enlarged, partial perspective view of the router table of FIG. 1.

FIG. 5 is a partial top plan view of the router table of FIG. 1.

FIG. 7 is a right side elevational view of the router table of FIG. 1.

DETAILED DESCRIPTION OF PRESENTLY PREFERRED EMBODIMENTS

Although the present invention can be made in many different forms, the presently preferred embodiments are described in this disclosure and shown in the attached drawings. This disclosure exemplifies the principles of the present invention and does not limit the broad aspects of the invention only to the illustrated embodiments.

Figure 1:
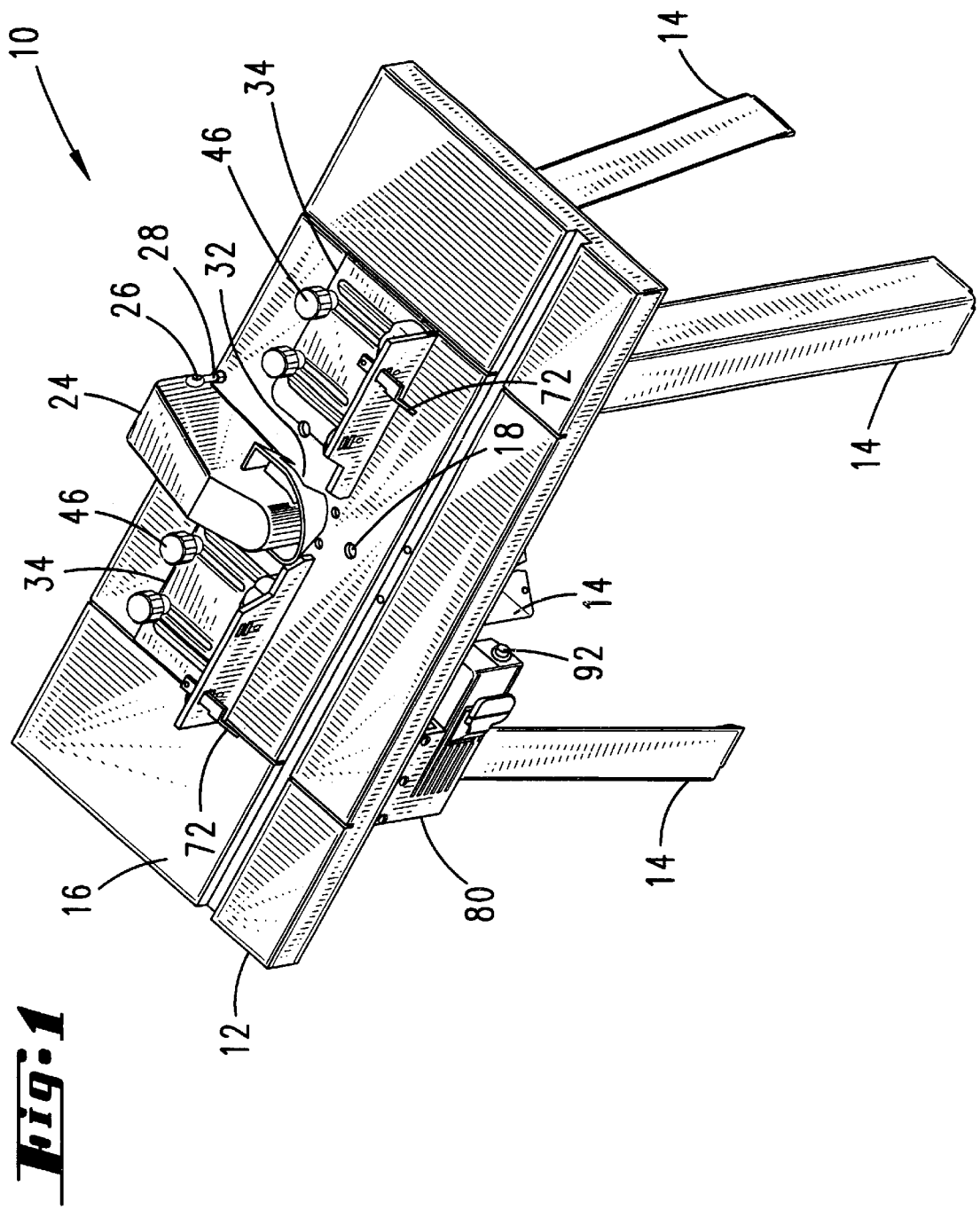
FIG. 1 is a perspective view of a router table according to the principals of the present invention.
Figure 2:
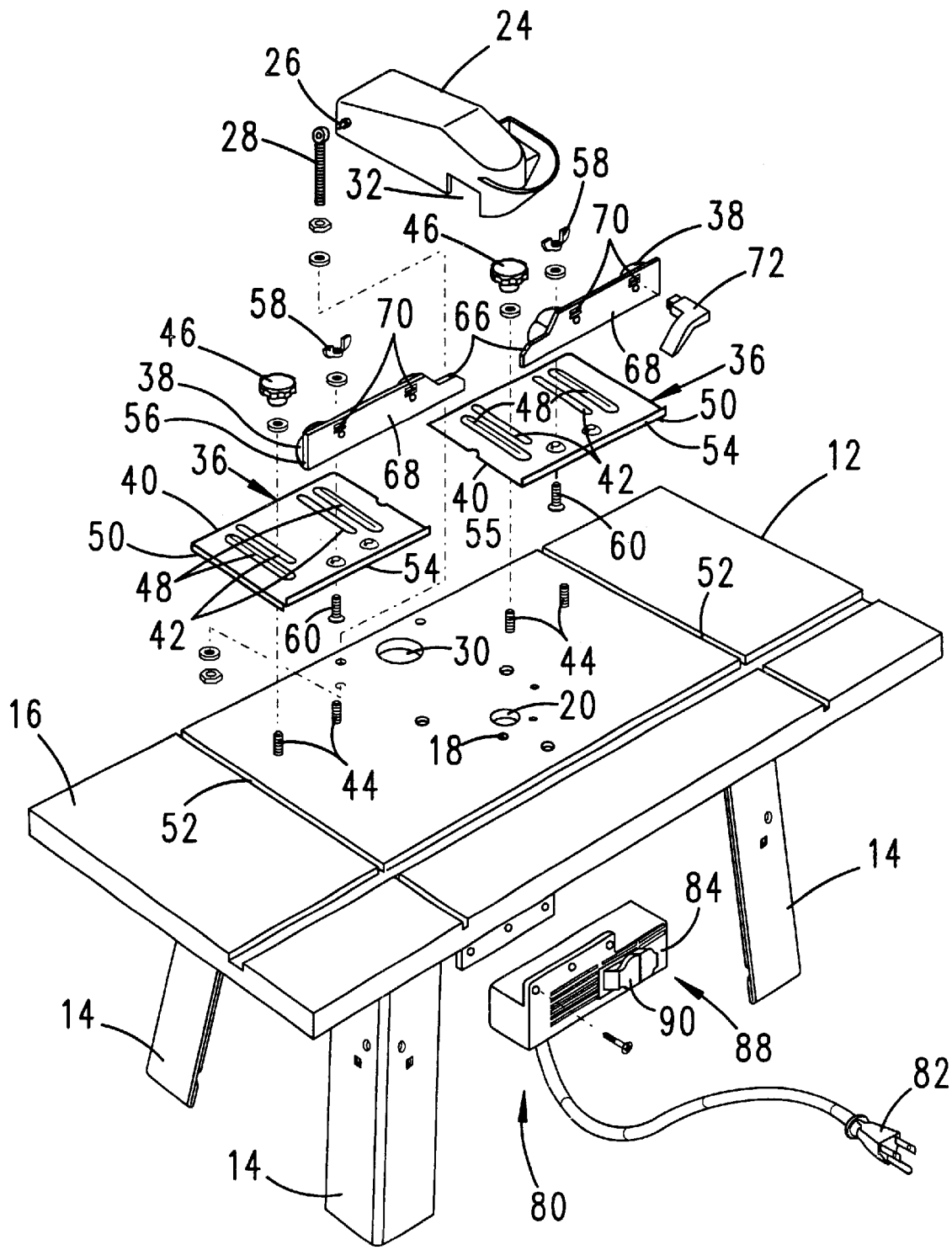
FIG. 2 is an exploded perspective view of the router table of FIG. 1.
Figure 4:
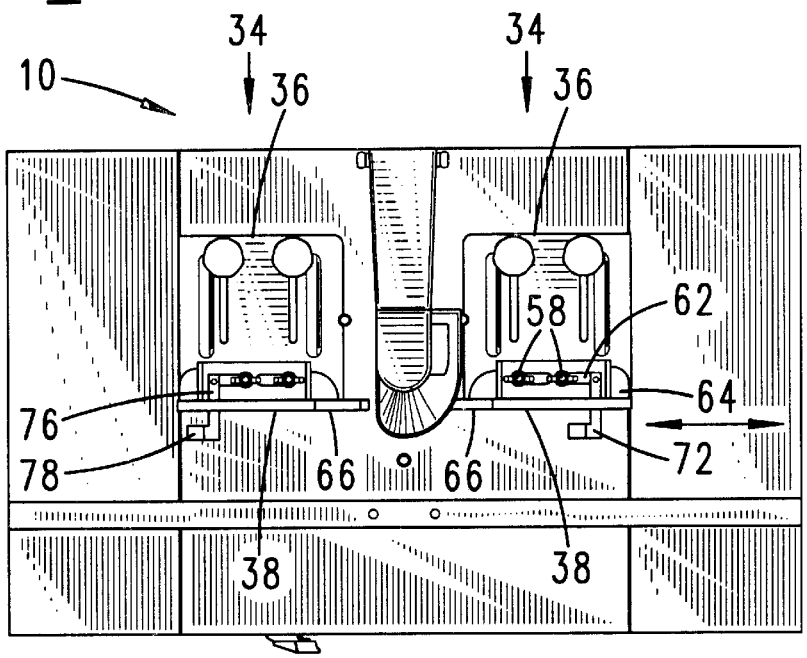
FIG. 4 is a top plan view of the router table of FIG. 1.

One router table 10 according to the present invention is shown in FIG. 1, and the router table 10 is shown partially exploded in FIG. 2. The router table 10 has a flat table top 12 and four support legs 14 attached to the underneath of the table top 12. The table top 12 has a top work surface 16 for supporting a workpiece when routing. Leg extensions (not shown) can be attached to the support legs 14, if desired. Various mounting holes 18 are provided to mount various routers (not shown) to the router table 10 underneath the table top 12. A router bit hole 20 extends through the table top 12 for a router bit 22 (FIG. 4). The table top 12 has a circular-shaped recess 13 (FIG. 6) in the bottom side and concentric with the router bit hole 20 for accommodating a disk-shaped adapter plate that can be mounted to a router.

A safety shield 24 is provided to protect the operator of the router table during routing. The safety shield 24 has a pivot pin 26 on both the left and right sides of the safety shield 24. The pivot pins are each rotatably received in left and right eyebolts 28 to pivotally mount the safety shield 24 to the table top 12.

A front portion of the safety shield 24 is positioned above the router bit hole 20 and a rear portion of the safety shield 24 is positioned above an exhaust hole 30 through the table top 12 (see FIG. 2 for the exhaust hole 30). The left and right pivot pins 26 are positioned at the rear portion of the safety shield 24 in the area of the exhaust hole 30. Accordingly, the front portion of the safety shield 24 pivots upward when a workpiece passes underneath the safety shield 24. Also, the safety shield can be pivoted upward to expose the router bit hole 20 and the router bit 22.

The safety shield 24 has a top, left and right sides, and front and back sides. The bottom of the safety shield 24 is open to the top surface 16 of the table top 12. The inside of the safety shield 24 is hollow which defines an exhaust flow path from the router bit hole 20—and the router bit 22—to the exhaust hole 30 for debris from the workpiece being cut. The debris exhaust flow path runs from the router bit hole 20 rearward and generally parallel to the table top 12, and then downward through the exhaust hole 30, generally perpendicular to the table top 12. The back side of the of the safety shield 24 deflects the debris downward through the exhaust hole 30. A vacuum hose can be connected to the exhaust hole 30 underneath the table top 12 to assist in removing and collecting the debris.

The left and right sides of the safety shield 24 each have a workpiece pass-through hole 32. The workpiece pass-through holes 32 and the inside area of the safety shield 24 between the workpiece pass-through holes 32 define an open path through the safety shield 24 for the workpiece, as shown in FIG. 7. Portions of two workpiece fences 34 may extend through the workpiece pass-through holes 32 as shown in FIG. 3. Some workpieces may have a small width and will pass through the workpiece pass-through holes 32 without raising the safety shield 24. Some workpieces may have a portion that extends upward from the top face of the workpiece, and that portion may pass through the workpiece pass-through holes 32. Some workpieces may have a width sufficiently large enough that the workpiece will pivot the front portion of the safety shield 24 upward to ride on top of the workpiece as the workpiece is passed by the router bit 22.

The router table 10 also has a workpiece fence system for guiding the workpiece during routing. The workpiece fence system includes left and right workpiece fences 34 which operate independently from each other. The left and right workpiece fences 34 are mirror images of each other, and each workpiece fence 34 has a fence base 36 and a fence front 38. The fence base 36 has a substantially flat body 40 with two parallel mounting slots 42 that extend in a front to rear direction. Threaded bolts 42 extend upward from the table top 12 and extend through the mounting slots 42. Knobs 46 are threaded onto the bolts 42 and are used to clamp the fence base 36 in a desired position on the top work surface 16 of the table top 12. Raised areas 48 may be provided to strengthen the fence base 36. Other mechanisms can be used to clamp the fence base 36 in various positions on the table top 12, if desired.

The fence base 36 has a downwardly extending guide flange 50 along an edge of the flat body 40. The guide flange 50 extends in the front to rear direction and slides in a slot 52 in the table top 12 which also extends in the front to rear direction. The guide flange 50 and the slot 52 restrict the movement of the fence base 36 in the front to rear direction. Of course, the front to rear direction as used in this disclosure includes movement from the front towards the rear and from the rear towards the front.

An upwardly extending guide flange 54 runs along a front edge of the flat body 40 of the fence base 36 and generally perpendicular to the guide flange 50. The fence front 38 has a slot 56 which receives the guide flange 54. Accordingly, the front fence 38 can slide in a side to side direction on the fence base 36. Fasteners, such as wing nuts 58 and bolts 60 pass through elongated slots 62 (FIG. 4) in a flange 64 of the fence front 38 to adjustably mount the fence front 38 to the fence base 36. Referring to FIG. 2, the front edges having the guide flanges 54 of the left and right fence bases 36 are spaced apart from each other by a gap 55.

FIGS. 4 and 5 show the adjustability of the fence system. Wing nuts 58 can be loosened to allow the left and right fence fronts 38 to independently slide in the side to side direction indicated by the arrows in FIG. 4. A reduced height portion 66 of the fence front 38 can be positioned close to or away from the router bit 22 as desired. Referring to FIG. 5, the knobs 46 can be loosened to allow the left and right workpiece fences 34 to independently slide in the front to rear direction as indicated by the arrows. The fence fronts 38 of the left and right workpiece fences 34 can be positioned aligned with each other (FIG. 4) or offset from each other (FIG. 5) as desired.

Referring to FIGS. 2 and 3, the fence front 38 has a vertical front workpiece face 68 for guiding the workpiece. A plurality of holes 70 are provided through the fence front 38 at the front workpiece face 68. One or more feather flaps 72 are removably positioned in the holes 70 to hold the workpiece 74 (FIG. 3) securely against the table top 12. The feather flap 72 has a first portion 76 extending from the workpiece fence 34 and a second portion 78 extending from the first portion 76 downward toward the top work surface 16 of the table top 12. An end of the second portion 78 contacts the top of the workpiece 74 and the feather flap 72 resiliently flexes to hold the workpiece 74 down as the workpiece 74 slides along the workpiece fences 34 and under the feather flaps 72. The first portion 76 of the feather flap 72 is substantially parallel to the top work surface 16, and the second portion 78 of the feather flap 72 forms an acute angle with the top work surface 16. The first and second portions 76, 78 of the feather flap 72 have rectangular shapes in cross-section perpendicular to their longitudinal lengths.

Referring to FIG. 2, holes 70 for the feather flaps 72 can be provided at various locations in the fence front 38 to allow for flexibility in placement of the feather flaps 72. The feather flaps 72 can be used with various types and sizes of workpieces due to the various locations of the holes 70. For example, upper holes 70 have a higher vertical elevation above the table top 12 than lower holes 70 so that the feather flaps 72 can be used with various thicknesses of workpieces.

Figure 6:
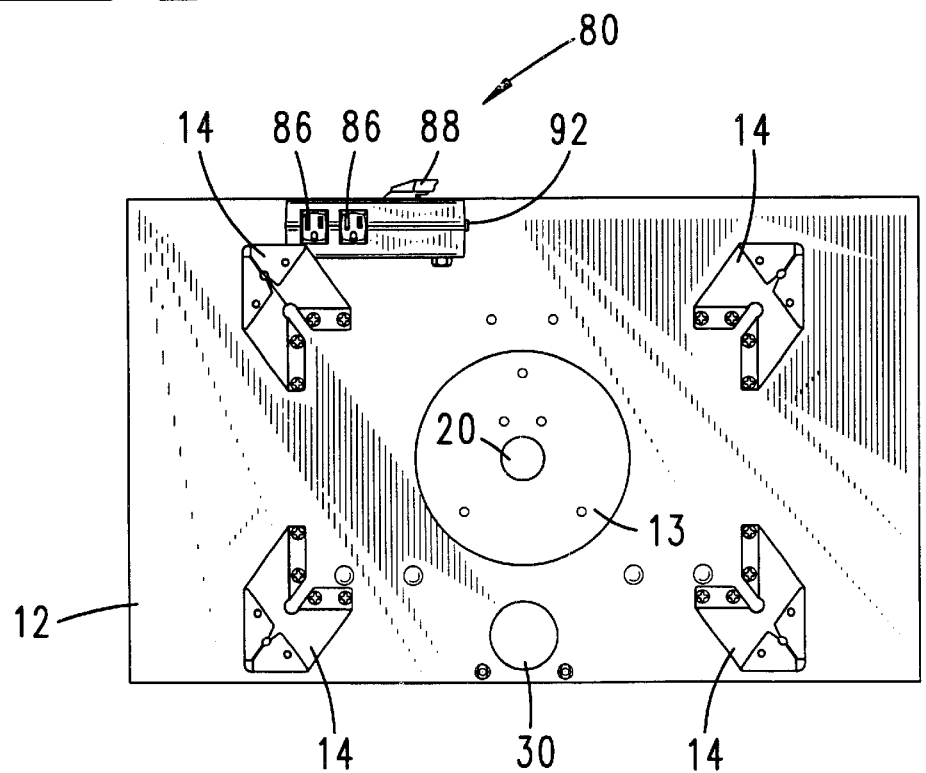
FIG. 6 is a bottom view of the router table of FIG. 1.

Referring to FIGS. 1, 2, and 6, the router table 10 has a switch box 80 mounted to the table top 12. The switch box 80 has an electrical plug 82 extending from a housing 84. At least one electrical outlet 86 is provided on a bottom side of the housing 84. An electrical ON/OFF switch 88 is provided on a front side of the housing 84. The ON/OFF switch 88 has safety key 90 which is engageable and disengagable with the ON/OFF switch 88 to enable and disable the switch 88. A resettable circuit breaker 92 provides electrical overload protection for the switch box 80.

Inside the housing 84, the switch box 80 is wired such that the electrical plug 82 provides incoming power to the ON/OFF switch 88. The ON/OFF switch 88 is wired to the outlets 86 and turns the power ON or OFF to the outlets 86 depending on whether the safety key 90 is in the switch 88 and the position of the switch 88. The circuit breaker 92 is wired between the electrical plug 82 and the switch 88 to cut power to the switch 88 and the outlets 86 and turn off the router or other device plugged into the outlets 86 during an overload situation.

While the presently preferred embodiments have been illustrated and described, numerous changes and modifications can be made without significantly departing from the spirit and scope of this invention. Therefore, the inventor intends that such changes and modifications are covered by the appended claims.

We claim as our invention:

1. A router table comprising:
   a table top having a top work surface, and a router bit hole through the table top;
   a plurality of support legs below the table top;
   a safety shield positioned above the router bit hole;
   a workpiece fence slidably positioned on the top work surface; and
   a feather flap extending from the workpiece fence;
   wherein the workpiece fence has a plurality of holes, and the feather flap is positioned in a selected hole of the plurality of holes.

2. A router table comprising:
   a table top having a top work surface, and a router bit hole through the table top;
   a plurality of support legs below the table top;
   a safety shield positioned above the router bit hole;
   a workpiece fence slidably positioned on the top work surface; and
   a feather flap extending from the workpiece fence;
   wherein the feather flap comprises a first portion extending from the workpiece fence and a second portion extending from the first portion downward toward the top work surface of the table top, the first portion of the feather flap being substantially parallel to the top work surface, and the second portion of the feather flap forming an acute angle with the top work surface.

3. The router table of claim 2, wherein the first and second portions of the feather flap have rectangular shapes.

4. A fence system for guiding a workpiece, comprising:
   a fence base having a left front edge portion spaced apart from a right front edge portion by a gap;
   a left fence front slidably mounted to the left front edge portion of the fence base;
   a right fence front slidably mounted to the right front edge portion of the fence base; and
   a feather flap extending from at least one of the left and right fence fronts;
   wherein each of the left and right fence fronts have a substantially vertical front workpiece face which has at least one hole, and the feather flap is removably positioned in a selected hole in the front workpiece face.

5. A fence system for guiding a workpiece, comprising:
   a fence base having a left front edge portion spaced apart from a right front edge portion by a gap;
   a left fence front slidably mounted to the left front edge portion of the fence base;
   a right fence front slidably mounted to the right front edge portion of the fence base; and
   a feather flap extending from at least one of the left and right fence fronts;
   wherein the feather flap has a first portion extending substantially perpendicular to the front workpiece face, and a second portion extending downward from the first portion.

* * * * *